(12) United States Patent
Lin

(10) Patent No.: US 12,287,975 B2
(45) Date of Patent: Apr. 29, 2025

(54) FLASH MEMORY CONTROLLER THAT CAN QUICKLY ENTER POWER SAVING MODE AFTER ENTERING IDLE STATE, ASSOCIATED FLASH MEMORY DEVICE, AND ASSOCIATED CONTROL METHOD

(71) Applicant: Silicon Motion, Inc., Hsinchu County (TW)

(72) Inventor: Wen-Sheng Lin, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/220,240

(22) Filed: Jul. 10, 2023

(65) Prior Publication Data

US 2024/0176517 A1 May 30, 2024

(30) Foreign Application Priority Data

Nov. 24, 2022 (TW) .................................. 111144910

(51) Int. Cl.
*G06F 3/06* (2006.01)

(52) U.S. Cl.
CPC .......... *G06F 3/0625* (2013.01); *G06F 3/0634* (2013.01); *G06F 3/0679* (2013.01)

(58) Field of Classification Search
CPC .... G06F 3/0625; G06F 3/0634; G06F 3/0679; G06F 3/0659
USPC ........................................................ 711/103
See application file for complete search history.

(56) References Cited

U.S. PATENT DOCUMENTS

| | | | |
|---|---|---|---|
| 2008/0117682 A1* | 5/2008 | Byeon | G06F 13/1684 365/185.18 |
| 2008/0294813 A1* | 11/2008 | Gorobets | G06F 12/0246 710/62 |
| 2009/0172308 A1 | 7/2009 | Prins | |
| 2018/0293191 A1* | 10/2018 | Li | G06F 13/1689 |
| 2020/0110543 A1* | 4/2020 | Huang | G06F 3/0625 |
| 2021/0018975 A1* | 1/2021 | Liang | G06F 1/28 |
| 2021/0319818 A1 | 10/2021 | Shin | |

FOREIGN PATENT DOCUMENTS

| | | |
|---|---|---|
| CN | 112988076 A | 6/2021 |
| CN | 113687769 A | 11/2021 |
| TW | I696074 B | 6/2020 |
| TW | I748542 B | 12/2021 |

* cited by examiner

*Primary Examiner* — Jared I Rutz
*Assistant Examiner* — Wei Ma
(74) *Attorney, Agent, or Firm* — Winston Hsu

(57) ABSTRACT

A control method of a memory device includes: controlling a flash memory controller to transmit a command to a flash memory module; determining whether the flash memory controller is in an idle state; in response to the flash memory controller being in the idle state, determining whether an idle time of the idle state exceeds a threshold value, wherein the threshold value is less than a time required for the flash memory module to complete executing a write command or an erase command; and in response to the idle time exceeding the threshold value, controlling the flash memory controller to enter a power saving mode to turn off a part of components in the flash memory controller.

15 Claims, 2 Drawing Sheets

FLASH MEMORY CONTROLLER THAT CAN QUICKLY ENTER POWER SAVING MODE AFTER ENTERING IDLE STATE, ASSOCIATED FLASH MEMORY DEVICE, AND ASSOCIATED CONTROL METHOD

BACKGROUND OF THE INVENTION

1. Field of the Invention

The present invention is related to a flash memory, and more particularly, to a flash memory controller that can quickly enter a power saving mode after entering an idle state, an associated flash memory device, and an associated control method.

2. Description of the Prior Art

In order to prolong usage time of a portable electronic device, a flash memory device can enter a power saving mode when it does not need to operate, wherein a part of the internal circuit components are turned off for reducing power consumption. Since the flash memory device includes a flash memory controller and a flash memory module, and the flash memory controller and the flash memory module need to communicate with each other for read, write, and/or erase operations, the flash memory device will not enter the power saving mode until both the flash memory controller and the flash memory module are in an idle state. Under a general condition, the flash memory controller will enter a power saving mode 100 milliseconds (ms) after an idle state has been entered, i.e. the flash memory controller remains in a power consumption state for 100 ms, which will cause unnecessary waste of power for the flash memory device.

SUMMARY OF THE INVENTION

It is therefore one of the objectives of the present invention to provide a flash memory device, wherein a flash memory controller included in the flash memory device can quickly enter a power saving mode after entering an idle state, to address the above-mentioned issues.

According to an embodiment of the present invention, a control method of a memory device is provided. The control method comprises: controlling a flash memory controller to transmit a command to a flash memory module; determining whether the flash memory controller is in an idle state; in response to the flash memory controller being in the idle state, determining whether an idle time of the idle state exceeds a threshold value, wherein the threshold value is less than a time required for the flash memory module to complete executing a write command or an erase command; and in response to the idle time exceeding the threshold value, controlling the flash memory controller to enter a power saving mode to turn off a part of components in the flash memory controller.

According to an embodiment of the present invention, a flash memory controller is provided, wherein the flash memory controller is arranged to access a flash memory module, the flash memory controller comprises a read only memory and a microprocessor, the read only memory is arranged to store a program code, and the microprocessor is arranged to execute the program code to control access of the flash memory module. After the microprocessor transmits a command to the flash memory module, the microprocessor determines whether the flash memory controller is in an idle state. In response to the flash memory controller being in the idle state, the microprocessor determines whether an idle time of the idle state exceeds a threshold value, wherein the threshold value is less than a time required for the flash memory module to complete executing a write command or an erase command. In response to the idle time exceeding the threshold value, the microprocessor controls the flash memory controller to enter a power saving mode to turn off a part of components in the flash memory controller.

According to an embodiment of the present invention, a memory device is provided. The memory device comprises a flash memory module and a flash memory controller. The flash memory controller is arranged to: transmit a command to the flash memory module; determine whether the flash memory controller is in an idle state; in response to the flash memory controller being in the idle state, determine whether an idle time of the idle state exceeds a threshold value, wherein the threshold value is less than a time required for the flash memory module to complete executing a write command or an erase command; and in response to the idle time exceeding the threshold value, control the flash memory controller to enter a power saving mode to turn off a part of components in the flash memory controller.

One of the benefits of the present invention is that, since the flash memory controller can quickly enter a power saving mode after being in an idle state without waiting for the flash memory module to complete executing a current command, power consumption of the memory device can be reduced more efficiently. In addition, after the flash memory controller resumes a normal mode after leaving the power saving mode, the flash memory controller can determine whether to transmit a reset signal for resetting the flash memory module according to whether the flash memory module is in a busy state, to improve efficiency of the flash memory controller after the resuming operation is performed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
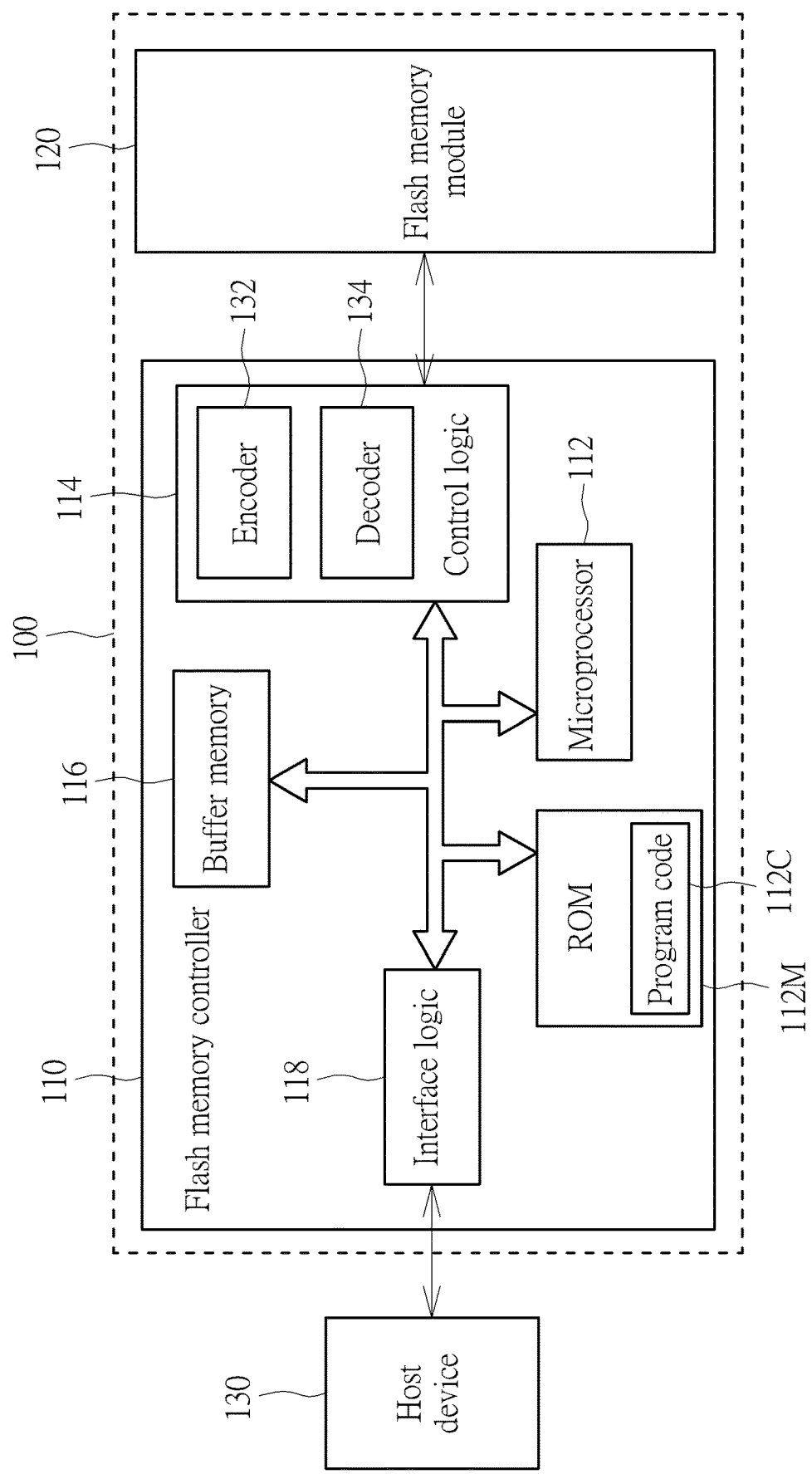
FIG. 1 is a diagram illustrating a memory device according to an embodiment of the present invention.

FIG. 1 is a diagram illustrating a memory device 100 according to an embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116, and an interface logic 118. The ROM 112M is arranged to store a program code 112C, and the microprocessor 112 is arranged to execute the program code 112C to control access of the flash memory module 120. The control logic 114 includes an encoder 132 and a decoder 134, wherein the encoder 132 is arranged to encode data that is written into the flash memory module 120 to generate a corresponding parity (also known as an error correction code (ECC)), and the decoder 134 is arranged to decode data that is read from the flash memory module 120.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

In a general operation of the memory device 100, the flash memory controller 110 may perform a read, write, and/or erase operation upon the flash memory module 120. For the read operation, the flash memory controller 110 may transmit a read command to the flash memory module 120, and the flash memory module 120 may read data from its internal memory array according to the read command, and transmit the data back to the flash memory controller 110. Afterwards, the decoder 134 in the flash memory controller 110 may perform decoding and error correction upon the received data. For the write operation and the erase operation, the flash memory controller 110 may transmit a write command or an erase command to the flash memory module 120, and the flash memory module 120 may write data into the memory array according to the received write command or erase a part of data in the memory array according to the received erase command. Afterwards, the flash memory controller 110 may check a state of the flash memory module 120 to determine whether the required operation is completed. As mentioned above, after the flash memory controller 110 transmits the command and the corresponding data to the flash memory module 120, the flash memory module 120 will need a period of time to perform the read, write, and/or erase operation (e.g. the erasing operation of the flash memory module 120 takes about 3.7 milliseconds (ms) to 8.2 ms according to different block types, and the writing operation takes 0.14 ms to 2.16 ms). Therefore, a traditional flash memory controller cannot enter a power saving mode during the period of operation time, resulting in waste of power.

The flash memory controller 110 of the present invention provides a method for quickly entering the power saving mode, enabling the memory device to directly enter the power saving mode when in an idle state without waiting for the flash memory module 120 to finish executing the current command or waiting for the end of a busy state of the flash memory module 120.

Figure 2:
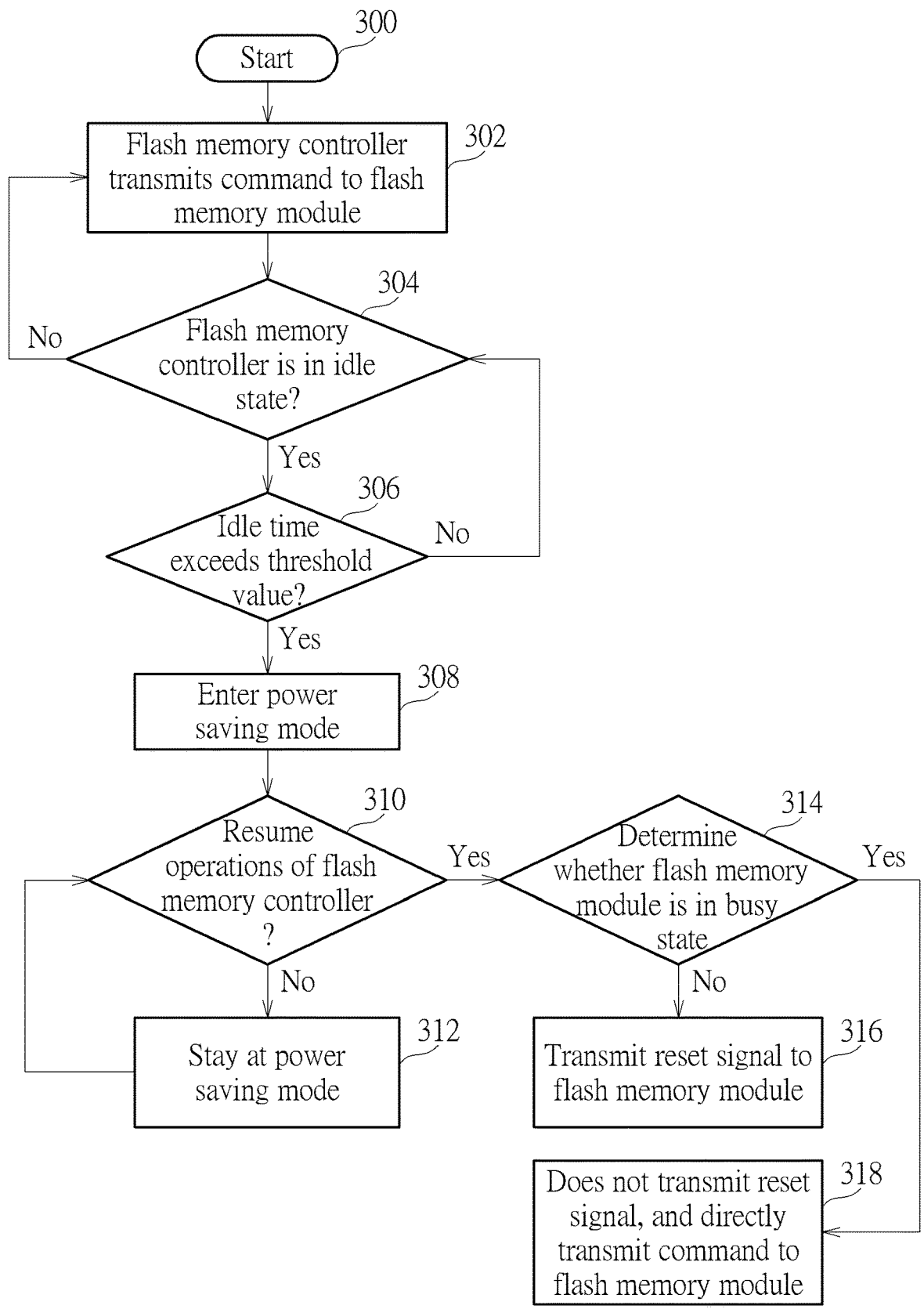
FIG. 2 is a flow chart of a control method of a memory device according to an embodiment of the present invention.

FIG. 2 is a flow chart of a control method of the memory device 100 according to an embodiment of the present invention.

In Step 300, the flow starts, the flash memory controller 110 and the flash memory module 120 are powered on, and an initialization operation is completed.

In Step 302, the flash memory controller 110 transmits one or more commands to the flash memory module 120, wherein the one or more commands include a part of a read command, a write command, and/or an erase command.

In Step 304, after the flash memory controller 110 transmits the one or more commands to the flash memory module 120, the microprocessor 112 determines whether the flash memory controller 110 is in an idle state according to whether the write/read command from the host device 130 is received or whether it is necessary to periodically detect the flash memory module 120. For example, in response to the microprocessor 120 receiving the write/read command from the host device 130, data to be written into the flash memory module 120 being in the buffer memory 116, the microprocessor 112 being necessary to perform a wear leveling operation upon the flash memory module 120 for moving data of one or more blocks with an erase count higher than a predetermined erase count threshold value to blocks with a relatively less erase count, the microprocessor 120 being necessary to perform a read reclaim operation upon the flash memory module 120 for moving data with a number of ECC error bits higher than a predetermined number of error bits to a new block, the microprocessor 112 being necessary to perform a read refresh operation upon the flash memory module 120 for moving data with a read count higher than a predetermined read count threshold value to a new block, the microprocessor 112 being necessary to perform a garbage collection operation upon the flash memory module 120 for moving valid data of multiple blocks with less valid data pages to a new block to release blocks for writing data, the microprocessor 112 being necessary to perform a block redundancy read upon the flash memory module 120 for actively triggering the read operation for blocks in the flash memory module 120 without actually obtaining data from the flash memory module 120 to avoid the problem of data retention due to the fact that the blocks have not been read for a long time, or the microprocessor 112 determining that other components (e.g. the control logic 114 or the interface logic 118) need to transmit a command or data to the flash memory module 120 or the host device 130, the microprocessor 112 determines that the flash memory controller 110 is not in the idle state, and Step 302 is entered. In addition, in response to the microprocessor 112 determining that the flash memory controller 110 does not need to perform any operation that needs to transmit a command or data to the flash memory module 120 or the host device 130, the microprocessor 112 determines that the flash memory controller 110 is in the idle state, and Step 306 is entered.

In Step 306, the microprocessor 112 determines whether an idle time of the flash memory controller 110 in the idle state exceeds a threshold value. If Yes, Step 308 is entered; if No, Step 304 is entered. In this embodiment, the threshold value can be a time between 1-10 ms, being a time less than a time required for the flash memory module 120 to complete executing a write command or to complete executing an erase command, wherein the time required for the flash memory module 120 to complete executing the write command can be a time required for writing data of a logical block address (e.g. 4 KB) into the memory array, and the time required for the flash memory module 120 to complete executing the erase command can be a time required for erasing a block. For example, assume that it takes 2.16 ms of busy time for the flash memory module 120 to write data corresponding to a write command into a triple-level cell (TLC) block of the flash memory module 120, it takes 8.2 ms of busy time for the flash memory module 120 to perform an erase operation upon a TLC block, and it takes 3.7 ms of busy time for the flash memory module 120 to perform an erase operation upon a single-level cell (SLC) block. Under this situation, the threshold value can be set as 1 ms (i.e. less than the above-mentioned 2.16 ms), can be set as 3 ms (i.e. less than the above-mentioned 8.2 ms), or can be set as 1.5 ms (i.e. less than the above-mentioned 3.7 ms).

In Step 308, the flash memory controller 110 enters the power saving mode to reduce power consumption. In this embodiment, the flash memory controller 110 will not determine whether the flash memory module 120 is still busy when entering the power saving mode. In other words, the flash memory module 120 may still execute the write command or an erase command from the flash memory controller 110 when the flash memory controller 110 enters the power saving mode. In the power saving mode, the microprocessor 112 will enter a low power consumption mode, where the microprocessor 112 will have a lower supply voltage or a lower clock signal frequency. In addition, the encoder 132 and the decoder 134 in the control logic 114 can be turned off, and a part of region in the buffer memory 116 can also be turned off, to reduce the power consumption.

Additionally, in this embodiment, the flash memory module 120 has its own mechanism to enter the power saving mode. For example, the flash memory module 120 can determine whether to enter the power saving mode according to an idle time length without receiving a command from the flash memory controller 110. In other words, the mechanism of the flash memory module 120 to enter the power saving mode can be different from that of the flash memory controller 110.

In Step 310, the microprocessor 112 determines whether to resume operations of the flash memory controller 110. If Yes, Step 314 is entered; if No, Step 312 is entered. In this embodiment, after the microprocessor 112 receives the command from the host device 130 or other trigger operations (e.g. trigger signals from other components or periodic trigger signals), a normal mode will be resumed. At this moment, the encoder 132 and the decoder 134 in the control logic 114 will start to operate.

In Step 312, the flash memory controller 110 will stay at the power saving mode, and Step 310 is entered to determine whether to resume operations of the flash memory controller 110.

In Step 314, the microprocessor 112 determines whether the flash memory module 120 is in a busy state. If Yes, Step 318 is entered; if No, Step 316 is entered. In this embodiment, after the operations of the flash memory controller 110 are resumed, the microprocessor 112 will immediately and actively transmit a check signal to the flash memory module 120 to read contents of one or more registers in the flash memory module 120, wherein the one or more registers store a current state of the flash memory module 120 (e.g. a busy state, a ready state, or an unknown state), and the busy state indicates that the flash memory module 120 is performing the read/write/erase operation.

In Step 316, the microprocessor 112 determines that the flash memory module 120 is not in the busy state (i.e. may be in the ready state or the unknown state), which represents that the flash memory module 120 may also enter the power saving mode and turn off some components during the time when the flash memory controller 110 enters the power saving mode. In order to avoid some problems of the flash memory module 120 being switched from the power saving mode to the normal mode, the microprocessor 112 will actively transmit a reset signal to the flash memory module 120 for resetting some settings in the flash memory module 120. For example, the reset signal can return settings of multiple registers in the flash memory module 120 to predetermined values (e.g. the flash memory module 120 can use a set of multiple preset read voltages for reading the memory array or reuse a set of temperature settings to adjust the read/write voltage).

In Step 318, the microprocessor 112 determines that the flash memory module 120 is in the busy state, which represents that the flash memory module 120 does not enter the power saving mode but still operates during the time the flash memory controller 110 enters the power saving mode. As a result, in order to improve efficiency, the microprocessor 112 will not actively transmit the reset signal to the flash memory module 120 but directly start to transmit the command to the flash memory module 120 for data reading/writing/erasing.

In summary, in the memory device of the present invention, since the flash memory controller can quickly enter a power saving mode after being in an idle state without waiting for the flash memory module to complete executing a current command, power consumption of the memory device can be reduced more efficiently. In addition, after the flash memory controller resumes a normal mode after leaving the power saving mode, the flash memory controller can determine whether to transmit a reset signal for resetting the flash memory module according to whether the flash memory module is in a busy state, to improve efficiency of the flash memory controller after the resuming operation is performed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a memory device, comprising:
controlling a flash memory controller to transmit a command to a flash memory module;
determining whether the flash memory controller is in an idle state;
in response to the flash memory controller being in the idle state, determining whether an idle time of the idle state exceeds a threshold value, wherein the threshold value is less than a time required for the flash memory module to complete executing a write command or an erase command; and in response to the idle time exceeding the threshold value, controlling the flash memory controller to enter a power saving mode to turn off a part of components in the flash memory controller;

controlling the flash memory controller to switch from the power saving mode to a normal mode, to resume operations of the flash memory controller;

after the operations of the flash memory controller are resumed, determining whether the flash memory module is in a busy state;

in response to the flash memory module not being in the busy state, generating a reset signal to reset the flash memory module; and in response to the flash memory module being in the busy state, not generating the reset signal to the flash memory module, and directly transmitting other commands to the flash memory module.

2. The control method of claim 1, wherein the threshold value is less than a time required for the flash memory module to complete executing a write command for writing data into a block of the flash memory module.

3. The control method of claim 1, wherein the threshold value is between 1-10 milliseconds.

4. The control method of claim 1, wherein after the operations of the flash memory controller are resumed, the step of determining whether the flash memory module is in the busy state comprises:

actively transmitting a check signal to the flash memory module to obtain a state of the flash memory module, for determining whether the flash memory module is in the busy state.

5. The control method of claim 1, wherein the step of in response to the flash memory module not being in the busy state, generating the reset signal to reset the flash memory module comprises:

in response to the flash memory module not being in the busy state, generating the reset signal to return settings of multiple registers in the flash memory module to predetermined values.

6. A flash memory controller, wherein the flash memory controller is arranged to access a flash memory module, and the flash memory controller comprises:

a read only memory, arranged to store a program code; and a microprocessor, arranged to execute the program code to control access of the flash memory module;

wherein after the microprocessor transmits a command to the flash memory module, the microprocessor determines whether the flash memory controller is in an idle state; in response to the flash memory controller being in the idle state, the microprocessor determines whether an idle time of the idle state exceeds a threshold value, wherein the threshold value is less than a time required for the flash memory module to complete executing a write command or an erase command; and in response to the idle time exceeding the threshold value, the microprocessor controls the flash memory controller to enter a power saving mode to turn off a part of components in the flash memory controller;

wherein after the flash memory controller is switched from the power saving mode to a normal mode to resume operations of the flash memory controller, the microprocessor determines whether the flash memory module is in a busy state; in response to the flash memory module not being in the busy state, the microprocessor generates a reset signal to reset the flash memory module; and in response to the flash memory module being in the busy state, the microprocessor does not generate the reset signal to the flash memory module, and directly starts transmitting other commands to the flash memory module.

7. The flash memory controller of claim 6, wherein the threshold value is less than a time required for the flash memory module to complete executing a write command for writing data into a block of the flash memory module.

8. The flash memory controller of claim 6, wherein the threshold value is between 1-10 milliseconds.

9. The flash memory controller of claim 6, wherein after the operations of the flash memory controller are resumed, the microprocessor actively transmits a check signal to the flash memory module to obtain a state of the flash memory module, for determining whether the flash memory module is in the busy state.

10. The flash memory controller of claim 6, wherein in response to the flash memory module not being in the busy state, the microprocessor generates the reset signal to return settings of multiple registers in the flash memory module to predetermined values.

11. A memory device, comprising:

a flash memory module; and a flash memory controller, arranged to access the flash memory module;

wherein the flash memory controller is arranged to:
transmit a command to the flash memory module;
determine whether the flash memory controller is in an idle state;
in response to the flash memory controller being in the idle state, determine whether an idle time of the idle state exceeds a threshold value, wherein the threshold value is less than a time required for the flash memory module to complete executing a write command or an erase command; and
in response to the idle time exceeding the threshold value, control the flash memory controller to enter a power saving mode to turn off a part of components in the flash memory controller;
control the flash memory controller to switch from the power saving mode to a normal mode to resume operations of the flash memory controller;
after the operations of the flash memory controller are resumed, determine whether the flash memory module is in a busy state;
in response to the flash memory module not being in the busy state, generate a reset signal to reset the flash memory module; and
in response to the flash memory module being in the busy state, not generate the reset signal to the flash memory module, and directly start transmitting other commands to the flash memory module.

12. The memory device of claim 11, wherein the threshold value is less than a time required for the flash memory module to complete executing a write command for writing data into a block of the flash memory module.

13. The memory device of claim 11, wherein the threshold value is between 1-10 milliseconds.

14. The memory device of claim 11, wherein after the operations of the flash memory controller are resumed, the step of determining whether the flash memory module is in the busy state comprises:

actively transmitting a check signal to the flash memory module to obtain a state of the flash memory module, for determining whether the flash memory module is in the busy state.

15. The memory device of claim 11, wherein the step of in response to the flash memory module not being in the busy state, generating the reset signal to reset the flash memory module comprises:

in response to the flash memory module not being in the busy state, generating the reset signal to return settings of multiple registers in the flash memory module to predetermined values.

* * * * *